US012733744B2

(12) United States Patent
Barth et al.

(10) Patent No.: US 12,733,744 B2
(45) Date of Patent: Sep. 15, 2026

(54) CONVERTIBLE BED SYSTEM

(71) Applicant: Ember Recreational Vehicles, Inc., Elkhart, IN (US)

(72) Inventors: Christopher Julius Barth, Bristol, IN (US); Andrew I. Mast, Shipshewana, IN (US); Spencer Charles Brown, Goshen, IN (US)

( * ) Notice: Subject to any disclaimer, the term of this patent is extended or adjusted under 35 U.S.C. 154(b) by 0 days.

(21) Appl. No.: 19/184,482

(22) Filed: Apr. 21, 2025

(65) Prior Publication Data

US 2025/0325113 A1 Oct. 23, 2025

Related U.S. Application Data

(60) Provisional application No. 63/636,326, filed on Apr. 19, 2024.

(51) Int. Cl.

| | |
|---|---|
| ***A47C 17/52*** | (2006.01) |
| ***A47C 17/32*** | (2006.01) |
| ***A47C 19/22*** | (2006.01) |
| ***B60P 3/39*** | (2006.01) |

(52) U.S. Cl.
CPC .............. *A47C 17/52* (2013.01); *A47C 17/32* (2013.01); *A47C 19/22* (2013.01); *B60P 3/39* (2013.01)

(58) Field of Classification Search
CPC ......... A47C 17/32; A47C 17/52; A47C 19/22; B60P 3/39
See application file for complete search history.

(56) References Cited

U.S. PATENT DOCUMENTS

| | | | | |
|---|---|---|---|---|
| 4,103,373 | A * | 8/1978 | Luedtke | A47C 17/50 5/147 |
| 7,451,503 | B2 * | 11/2008 | Caillaud | A47C 17/50 5/8 |
| 8,316,479 | B2 * | 11/2012 | Colombo | A47C 19/028 5/8 |
| 11,375,822 | B2 * | 7/2022 | Wesolowski | A47C 17/165 |
| 2008/0229509 | A1 * | 9/2008 | DiMattia | A47C 17/32 5/722 |
| 2021/0353072 | A1 * | 11/2021 | Aldrich | A47C 19/22 |

(Continued)

FOREIGN PATENT DOCUMENTS

| | | | | |
|---|---|---|---|---|
| CN | 101785611 A | | 7/2010 | |
| CN | 108158276 A | * | 6/2018 | A47C 19/028 |
| CN | 209644438 U | * | 11/2019 | A47C 19/028 |

(Continued)

*Primary Examiner* — David E Sosnowski
(74) *Attorney, Agent, or Firm* — Oppenhuizen Law PLC; David L. Oppenhuizen

(57) ABSTRACT

A bed assembly includes a frame having a base and a rail extending laterally along the base and coupled to the base, the rail dividing the base into a first base portion and a second base portion. A pair of platforms are arranged to support a pair of mattresses, with at least one platform being slidably coupled to the rail and configured to pivot between a sleeping position and a folded position. In the sleeping position, the pair of platforms are disposed horizontally and vertically above the first base portion, and in the folded position, the pair of platforms extends in a vertical direction relative to the base. The bed assembly also includes a cabinet slidably coupled to the frame and arranged to move laterally relative to the pair of platforms.

7 Claims, 4 Drawing Sheets

(56) References Cited

U.S. PATENT DOCUMENTS

2025/0351969 A1 * 11/2025 Bartlett .................. A47C 17/62

FOREIGN PATENT DOCUMENTS

| | | | | | |
|---|---|---|---|---|---|
| CN | 211833647 | U | * | 11/2020 | ........... A47C 19/028 |
| CN | 112220269 | A | * | 1/2021 | ........... A47C 19/028 |
| DE | 2623536 | A1 | | 12/1977 | |
| DE | 102018000115 | A1 | | 7/2019 | |
| EP | 3443867 | A1 | | 2/2019 | |
| FR | 2905576 | A1 | * | 3/2008 | ............. A47C 17/46 |
| KR | 20260060838 | A | * | 5/2026 | ............. A47C 19/22 |

* cited by examiner

CONVERTIBLE BED SYSTEM

CROSS-REFERENCE TO RELATED APPLICATIONS

This application claims priority to U.S. Application No. 63/636,326, filed Apr. 19, 2024, which is hereby incorporated by reference in its entirety.

BACKGROUND

1. Field of the Invention

The present disclosure relates to convertible bed systems, and more particularly to a Murphy bed assembly configurable in multiple arrangements with an integrated sliding cabinet.

2. Description of the Prior Art

Convertible furniture and space-saving bed systems have become increasingly popular, particularly in urban environments where living spaces are often limited. These systems aim to maximize the utility of available floor space by providing multiple functions within a single piece of furniture. Murphy beds, also known as wall beds or pull-down beds, have long been a staple of space-efficient design, allowing a bed to be concealed vertically against a wall when not in use.

In recent years, there has been growing interest in more versatile convertible bed systems that can adapt to various sleeping arrangements and living space configurations. However, existing designs often lack flexibility in terms of bed size options and storage integration. Many systems are limited to a single bed configuration or require complex mechanisms to convert between different arrangements. Additionally, the integration of storage solutions with convertible bed systems has typically been an afterthought, resulting in inefficient use of space or compromised functionality.

Furthermore, current convertible bed systems frequently present challenges in terms of ease of use and aesthetics. Some designs require considerable physical effort to transition between configurations or involve exposed mechanical components that detract from the overall appearance of the living space. There is a need for more user-friendly and visually appealing solutions that seamlessly blend into modern interior design while providing enhanced versatility and functionality.

As living spaces continue to evolve, there remains room for improvement in convertible bed systems that can offer multiple sleeping configurations, integrated storage options, and smooth transitions between different arrangements. Addressing these challenges could lead to more efficient use of living spaces and improved quality of life for individuals residing in compact environments.

SUMMARY

According to an aspect of the present disclosure, a bed assembly is provided. The bed assembly includes a frame having a base and a rail extending laterally along the base and coupled to the base, the rail dividing the base into a first base portion and a second base portion. The bed assembly also includes a pair of platforms arranged to support a pair of mattresses, at least one platform of the pair of platforms being slidably coupled to the rail and configured to pivot between a sleeping position and a folded position. In the sleeping position, the pair of platforms are disposed horizontally and vertically above the first base portion, and in the folded position, the pair of platforms extends in a vertical direction relative to the base. The bed assembly further includes a cabinet slidably coupled to the frame and arranged to move laterally relative to the pair of platforms.

According to other aspects of the present disclosure, the bed assembly may include one or more of the following features. The cabinet may be slidably coupled to a second rail extending laterally along a cabinet frame positioned above the base. The cabinet may be suspended from the second rail and may extend vertically downward from the cabinet frame. Each platform of the pair of platforms may be pivotally coupled to the rail at a first end of the platform. The pair of platforms may pivot about an axis substantially parallel to the rail. The bed assembly may further comprise a pair of mattresses, each mattress positioned on a respective platform of the pair of platforms. Each mattress of the pair of mattresses may include a fold line extending laterally across the mattress, the fold line dividing the mattress into a first mattress portion and a second mattress portion.

According to another aspect of the present disclosure, a method of configuring a bed assembly is provided. The method includes providing a frame having a base and a rail extending laterally along the base and coupled to the base, the rail dividing the base into a first base portion and a second base portion. The method also includes pivoting a pair of platforms arranged to support a pair of mattresses between a sleeping position and a folded position, wherein at least one platform of the pair of platforms is slidably coupled to the rail. The method further includes sliding a cabinet laterally relative to the pair of platforms, wherein the cabinet is slidably coupled to the frame.

According to other aspects of the present disclosure, the method may include one or more of the following features. In the sleeping position, the pair of platforms may be disposed horizontally and vertically above the first base portion, and in the folded position, the pair of platforms may extend in a vertical direction relative to the base. The cabinet may be slidably coupled to a second rail extending laterally along a cabinet frame positioned above the base. The cabinet may be suspended from the second rail and may extend vertically downward from the cabinet frame. The method may further comprise positioning a pair of mattresses on the pair of platforms, each mattress of the pair of mattresses including a fold line extending laterally across the mattress. The fold line may divide each mattress into a first mattress portion and a second mattress portion. The method may further comprise folding the first mattress portion relative to the second mattress portion along the fold line when pivoting the pair of platforms from the sleeping position to the folded position.

According to another aspect of the present disclosure, a convertible bed system is provided. The convertible bed system includes a frame having a base and a first rail extending laterally along the base. The system also includes a pair of platforms pivotably coupled to the first rail and configured to pivot between a horizontal sleeping position and a vertical folded position, wherein at least one platform of the pair of platforms is slidably coupled to the first rail. The system further includes a cabinet frame positioned above the base and a second rail coupled to the cabinet frame, wherein a cabinet is slidably coupled to the second rail and arranged to move laterally relative to the pair of platforms.

According to other aspects of the present disclosure, the convertible bed system may include one or more of the following features. The cabinet may be suspended from the second rail and may extend vertically downward from the cabinet frame. The system may further comprise a pair of mattresses, each mattress positioned on a respective platform of the pair of platforms. Each mattress of the pair of mattresses may include a fold line extending laterally across the mattress, the fold line dividing the mattress into a first mattress portion and a second mattress portion. The first mattress portion may be configured to fold relative to the second mattress portion along the fold line when the pair of platforms pivot from the horizontal sleeping position to the vertical folded position. The cabinet may be configured to slide along the second rail to a position between the pair of platforms when the pair of platforms are in the horizontal sleeping position and separated from each other.

For a more complete understanding, reference is made to the following detailed description and accompanying drawings. In the drawings, like reference characters refer to like parts throughout the views in which:

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to a convertible bed assembly that provides versatile sleeping arrangements. The bed assembly may be configured in multiple ways to accommodate different sleeping needs and space requirements. In some cases, the bed assembly may be arranged to form a single large sleeping surface, while in other cases, the bed assembly may be configured to provide separate sleeping areas. The convertible nature of the bed assembly allows for efficient use of space, making it suitable for various living environments where adaptability is desired. The bed assembly may include movable components that enable easy transformation between different configurations, providing flexibility in sleeping arrangements without the need for separate pieces of furniture.

Figure 1:
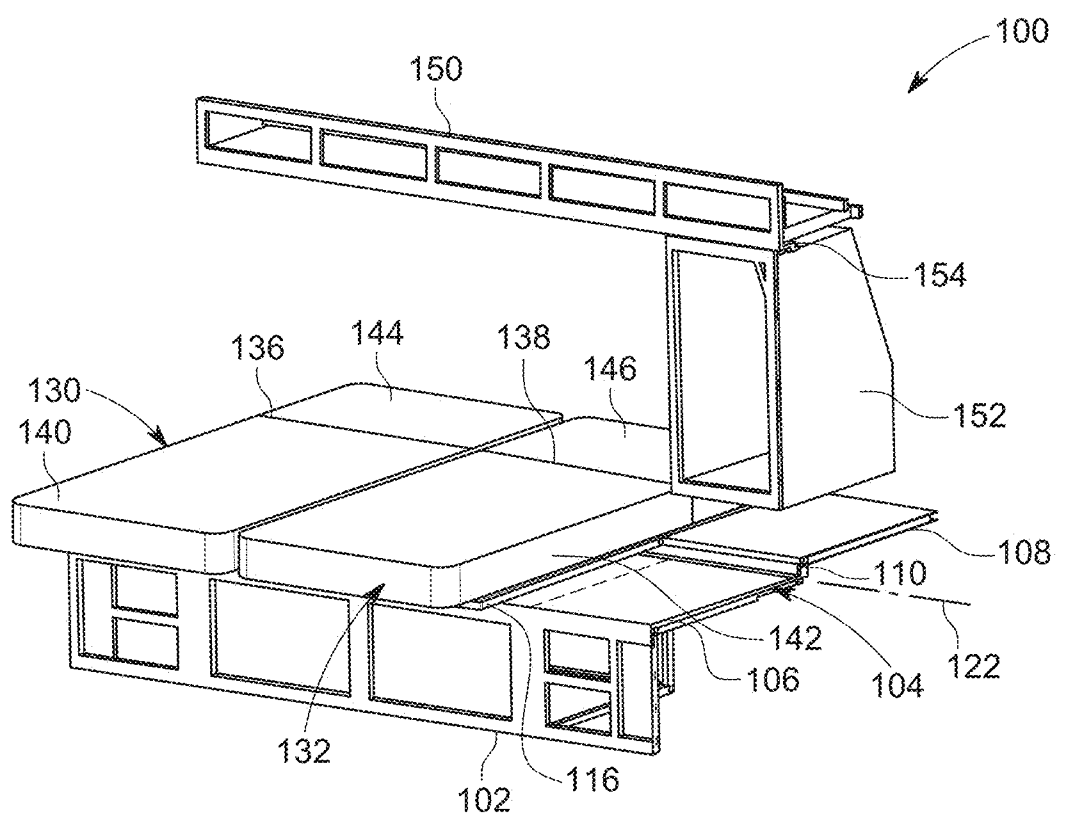
FIG. 1 illustrates a perspective view of a bed assembly arranged in a first sleeping configuration, in accordance with an embodiment of the disclosure.
Figure 2:
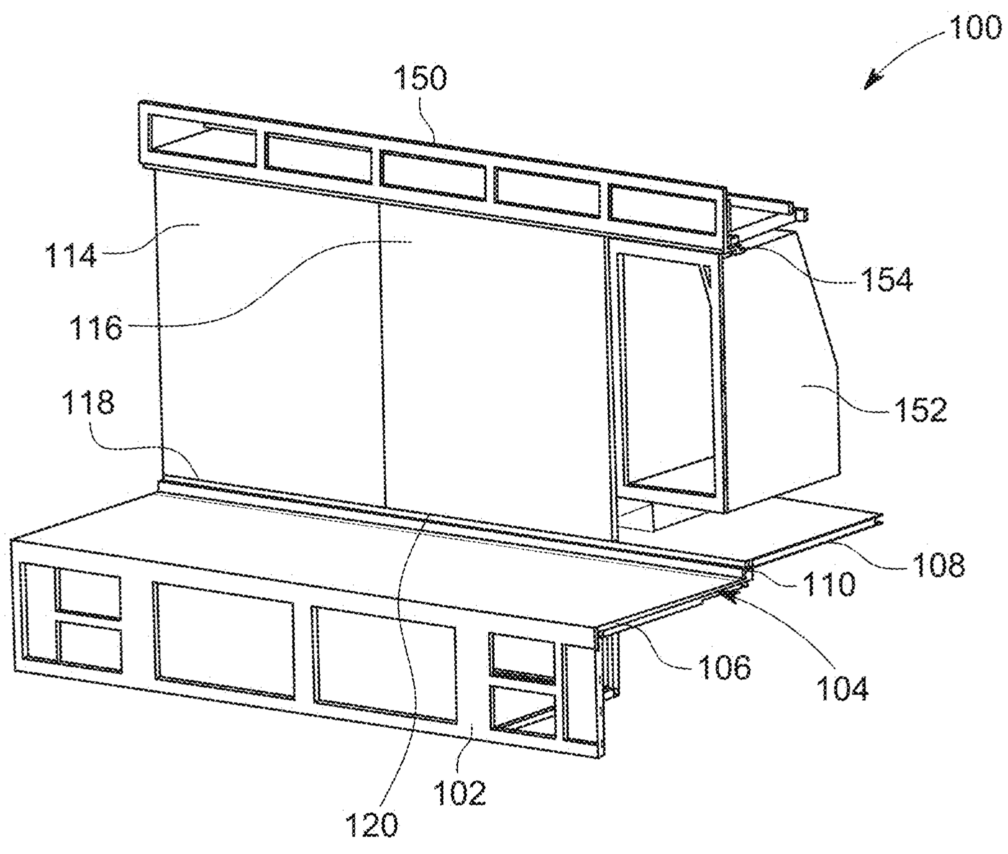
FIG. 2 illustrates a perspective view of the bed assembly arranged in a folded configuration, in accordance with an embodiment of the disclosure.

Referring to FIG. 1 and FIG. 2, a bed assembly 100 includes a frame 102 that forms the foundation of the bed assembly 100. The frame 102 includes a base 104 that may be arranged substantially horizontally relative to a supporting surface such as a floor. In some cases, the base 104 may be constructed from materials that are commonly found and used in recreational vehicle interiors, such as wood and wood products like plywood, MDF, laminated wood, and other similar materials. These materials may provide an appropriate balance of strength, weight, and cost-effectiveness, making them suitable for the bed assembly 100 while maintaining compatibility with typical recreational vehicle construction standards.

The base 104 is divided into a first base portion 106 and a second base portion 108 by a first rail 110. The first rail 110 extends laterally along the base 104 and may be coupled to the base 104. In some cases, the first rail 110 may be positioned substantially centrally on the base 104, creating two approximately equal base portions. However, in other cases, the positioning of the first rail 110 may be asymmetrical, resulting in base portions of different sizes.

The first rail 110 may serve multiple functions within the bed assembly 100. In addition to dividing the base 104, the first rail 110 may provide structural support to the frame 102 and may serve as a coupling point for other components of the bed assembly 100. The first rail 110 may be constructed from metal and formed as an elongated semi-enclosed channel that defines a guided pathway for a carriage. This carriage may support the platforms 114, 116, allowing them to slide smoothly along the first rail 110 while maintaining structural integrity and proper alignment during both movement and stationary use.

In some cases, the first base portion 106 and the second base portion 108 may be at different vertical levels relative to each other. This vertical offset may be achieved by the positioning and design of the first rail 110. The vertical offset between the first base portion 106 and the second base portion 108 may contribute to the functionality and versatility of the bed assembly 100, allowing for different configurations and uses of the space above each base portion.

The frame 102, including the base 104 and the first rail 110, forms a stable and robust foundation for the bed assembly 100. This structure may allow for the attachment and movement of other components, such as platforms and mattresses, which will be described in more detail in subsequent sections. The design and construction of the frame 102 may contribute significantly to the overall stability, durability, and functionality of the bed assembly 100.

Based upon the foregoing disclosure, it is seen that the present disclosure provides a bed assembly with a frame structure that offers several advantages. The use of lightweight, high-strength materials in the frame construction may result in a bed assembly that is both sturdy and easy to move or reconfigure. The division of the base into two portions by the first rail may allow for versatile bed configurations, potentially accommodating different sleeping arrangements or space utilization needs. Additionally, the robust frame structure may provide a stable foundation for the movable components of the bed assembly, potentially enhancing the overall user experience and longevity of the product.

The bed assembly 100 includes a first platform 114 and a second platform 116 arranged to support a pair of mattresses. The first platform 114 and the second platform 116 may be pivotably coupled to the first rail 110. In some cases, the first platform 114 may include a first platform end 118, and the second platform 116 may include a second platform end 120. The first platform end 118 and the second platform end 120 may be pivotally coupled to the first rail 110.

Figure 3:
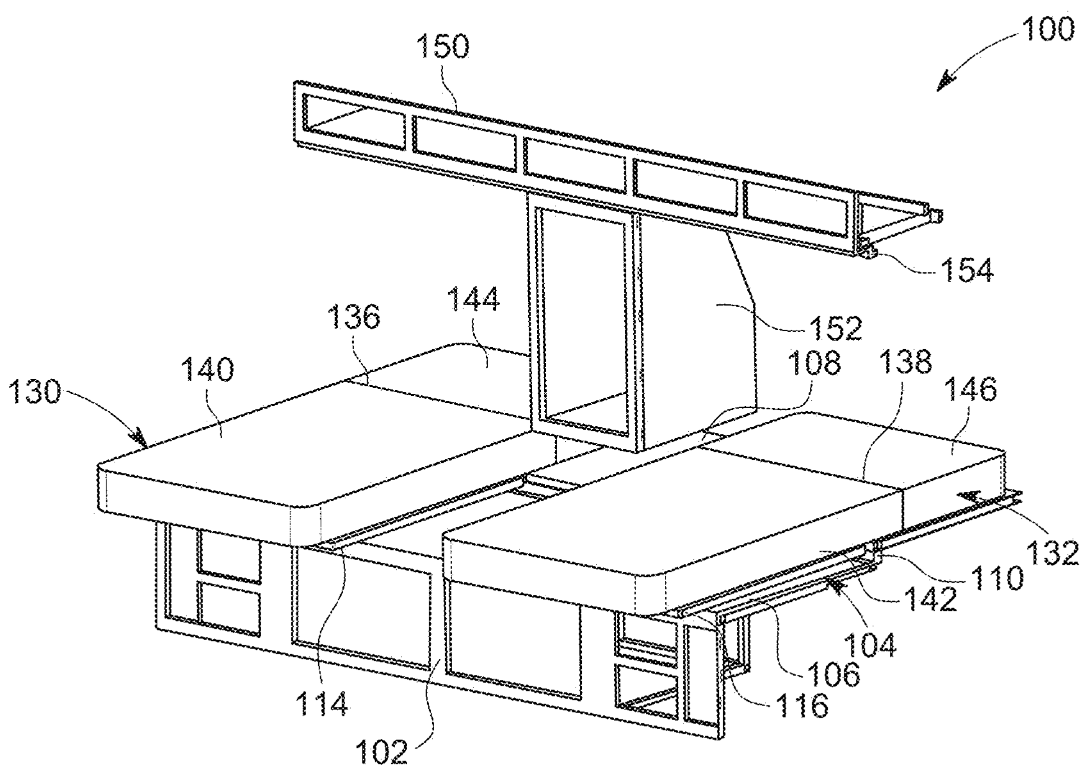
FIG. 3 illustrates a perspective view of the bed assembly arranged in a second sleeping configuration, in accordance with an embodiment of the disclosure.

As shown in FIG. 1 and FIG. 3, the first platform 114 and the second platform 116 may be configured to pivot about a pivot axis 122. The pivot axis 122 may be substantially parallel to the first rail 110. This pivoting configuration allows the first platform 114 and the second platform 116 to move between a sleeping position and a folded position.

In the sleeping position, as illustrated in FIG. 1 and FIG. 3, the first platform 114 and the second platform 116 may be disposed horizontally and vertically above the first base portion 106. This arrangement provides a suitable surface for supporting mattresses in a horizontal orientation for sleeping.

Figure 4:
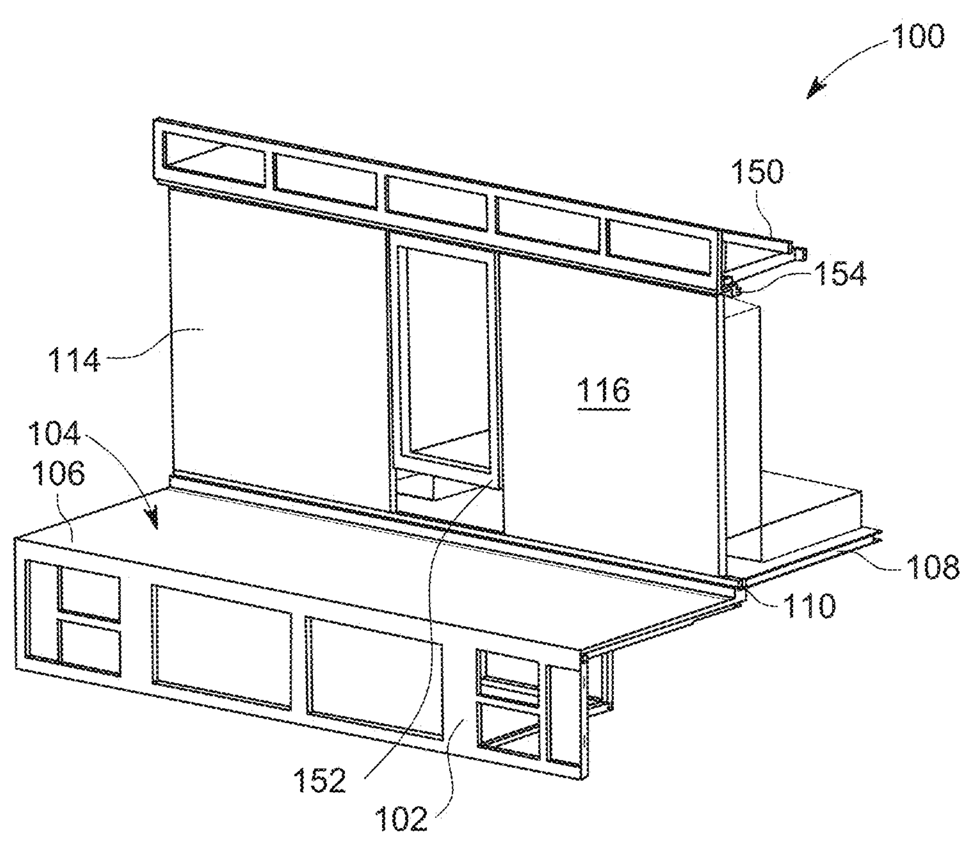
FIG. 4 illustrates a perspective view of the bed assembly arranged in a second folded configuration, in accordance with an embodiment of the disclosure.

In the folded position, as shown in FIG. 2 and FIG. 4, the first platform 114 and the second platform 116 may extend in a vertical direction relative to the base 104. This configuration allows for space-saving storage of the bed assembly 100 when not in use.

In some cases, at least one of the first platform 114 or the second platform 116 may be slidably coupled to the first rail 110. This sliding capability allows for adjustable positioning of the platforms along the length of the first rail 110. The first rail 110 may incorporate a bearing system to facilitate smooth sliding movement. In some implementations, the bearing system may include recirculating ball bearings or roller bearings integrated into the first rail 110.

The bed assembly 100 may include a mechanism for securing the first platform 114 and the second platform 116 in their respective positions. In some cases, an automatic locking system may be incorporated. This system may engage when the first platform 114 and the second platform 116 are fully extended in the sleeping position or fully raised in the folded position. The automatic locking system may utilize spring-loaded pins that automatically engage with corresponding holes in the first rail 110 or the frame 102.

Based upon the foregoing disclosure, it is seen that the present disclosure provides a bed assembly with versatile sleeping configurations. The pivoting and sliding capabilities of the platforms allow for easy conversion between a sleeping position and a folded position, maximizing space utilization. The incorporation of a bearing system and an automatic locking mechanism enhances the ease of use and stability of the bed assembly. Furthermore, the ability to support multiple mattress configurations provides flexibility in accommodating different sleeping arrangements within a single bed assembly.

The bed assembly 100 may include a first mattress 130 and a second mattress 132, as shown in FIG. 1 and FIG. 3. In some cases, the first mattress 130 and the second mattress 132 may be positioned on the first platform 114 and the second platform 116, respectively. Each mattress of the pair of mattresses may include a fold line extending laterally across the mattress. For example, the first mattress 130 may include a first fold line 136, and the second mattress 132 may include a second fold line 138.

The first fold line 136 may divide the first mattress 130 into a first mattress portion 140 and a third mattress portion 144. Similarly, the second fold line 138 may divide the second mattress 132 into a second mattress portion 142 and a fourth mattress portion 146. This configuration may enable the mattresses to fold along with the platforms when the bed assembly 100 transitions between the sleeping position and the folded position.

In some cases, when the pair of platforms pivot from the horizontal sleeping position to the vertical folded position, the first mattress portion 140 may be configured to fold relative to the third mattress portion 144 along the first fold line 136. Likewise, the second mattress portion 142 may fold relative to the fourth mattress portion 146 along the second fold line 138. This folding capability may allow the mattresses to conform to the vertical orientation of the platforms in the folded position without requiring removal or separate storage of the mattresses.

The mattresses may, in some cases, incorporate a modular design with interchangeable sections. This design may allow users to customize firmness levels on different parts of the bed or replace worn sections without needing to replace the entire mattress. For example, the first mattress portion 140 may have a different firmness level than the third mattress portion 144, allowing for personalized comfort preferences.

In some implementations, the modular sections of the mattresses may be secured together using strong hook-and-loop fasteners or a zipper system. This securing mechanism may ensure that the mattress sections remain properly aligned during use while still allowing for easy reconfiguration or replacement of individual sections as needed.

The modular design and folding capability of the mattresses may provide flexibility in the bed assembly 100, allowing for easy transitions between different configurations and personalized comfort options for users.

Based upon the foregoing disclosure, it is seen that the present disclosure provides a bed assembly that offers enhanced versatility and space-saving features. The bed assembly surpasses prior art designs because the folding mattress configuration allows for seamless transitions between sleeping and storage positions without the need for separate mattress storage. Additionally, the modular mattress design provides customization options not typically found in conventional bed systems, allowing users to tailor their sleeping surface to their individual preferences and replace worn sections as needed, potentially extending the overall lifespan of the mattress.

The bed assembly 100 may include a cabinet frame 150 positioned above the base 104. In some cases, the cabinet frame 150 may be fixedly attached to a wall or other supporting structure. A second rail 154 may extend laterally along the cabinet frame 150. The second rail 154 may be substantially parallel to the first rail 110 and may have a length approximately equal to the length of the first rail 110.

A cabinet 152 may be slidably coupled to the second rail 154. The cabinet 152 may extend vertically downward from the cabinet frame 150 and may be suspended from the second rail 154. In some cases, the cabinet 152 may be arranged to move laterally relative to the pair of platforms 114, 116. The cabinet 152 may be configured to slide along the second rail 154, allowing for positioning at various points along the length of the second rail 154.

The sliding mechanism for the cabinet 152 may include a carriage system comprising a track assembly and a rolling carriage. The track assembly may include an elongated semi-enclosed channel that defines a guided pathway for the carriage. The carriage may consist of one or more wheels or rollers configured to roll within the track while being partially enclosed by its structure. In some cases, the rollers may incorporate bearings or lubricant to reduce friction and improve efficiency.

The lateral movement of the cabinet 152 allows for flexible positioning in different bed configurations. As shown in FIG. 1, when the platforms 114, 116 are arranged in a first sleeping configuration to form a double-wide mattress configuration, such as a king mattress in one embodiment, the cabinet 152 may be positioned to one side of the platforms 114, 116. In FIG. 3, which illustrates a second sleeping configuration with two separate beds, which could be two twin beds in one embodiment, the cabinet 152 may be positioned between the separated platforms 114, 116, providing a divider between the two sleeping areas.

When the platforms 114, 116 are in the sleeping position, as shown in FIG. 1 and FIG. 3, the cabinet 152 may be moved laterally along the second rail 154. This allows for flexible use of the space when the bed is not in use, as the cabinet 152 can be positioned as needed for storage or access. This also allows the cabinet to be positioned as desired, depending on the sleeping configuration.

Based upon the foregoing disclosure, it is seen that the present disclosure provides a bed assembly with a slidable cabinet that offers enhanced versatility and space utilization. The ability to reposition the cabinet laterally allows for adaptable room configurations, accommodating different sleeping arrangements and maximizing usable space when the bed is folded. The sliding mechanism, whether using a traditional rolling carriage or other suitable mechanism, enables smooth and effortless movement of the cabinet, enhancing user convenience and functionality.

The bed assembly 100 may be configured in various sleeping and folded arrangements through the interaction of its components. In some cases, the bed assembly 100 may be arranged in a first sleeping configuration, as shown in FIG. 1. In this configuration, the pair of platforms 114, 116 may be positioned horizontally above the first base portion 106, with the platforms 114, 116 adjacent to each other. The first mattress 130 and second mattress 132 may be placed on the platforms 114, 116 respectively, creating a single large sleeping surface, such as a king-sized bed. The cabinet 152 may be positioned to either side of the platforms 114, 116.

To transition to a second sleeping configuration, as illustrated in FIG. 3, one or both of the platforms 114, 116 may be slid along the first rail 110 to create a space between them. The cabinet 152 may then be slid along the second rail 154 to a position between the separated platforms 114, 116. This arrangement may create two separate smaller-sized sleeping areas with the cabinet 152 serving as a divider, such as two twin beds.

In some cases, the bed assembly 100 may be converted to a folded configuration, as shown in FIG. 2 and FIG. 4. To achieve this, the platforms 114, 116 may be pivoted from their horizontal sleeping position to a vertical folded position. During this transition, the first mattress portion 140 and second mattress portion 142 of each mattress 130, 132 may fold relative to the third mattress portion 144 and fourth mattress portion 146 respectively, along the fold lines 136, 138.

In the folded configuration illustrated in FIG. 2, the platforms 114, 116 may be positioned adjacent to each other in their vertical orientation. Alternatively, as shown in FIG. 4, the platforms 114, 116 may be separated in their vertical position, with the cabinet 152 positioned between them.

The versatility of the bed assembly 100 may be further enhanced by the sliding capability of the cabinet 152 along the second rail 154. This feature may allow the cabinet 152 to be positioned as needed, whether serving as a nightstand in the king bed configuration, a divider in the twin bed configuration, or stored to the side when not in use.

The bed assembly disclosed herein may be particularly well-suited for use in recreational vehicles, including various types of travel trailers. In some aspects, the compact and convertible nature of the bed assembly may allow for efficient use of limited space typically found in RVs, motorhomes, fifth-wheel trailers, and pop-up campers. The ability to transition between a large sleeping surface and separate smaller beds may accommodate different sleeping arrangements for families or groups traveling together. In some cases, the folding capability of the platforms and mattresses may provide additional living space during daytime use, a feature that may be especially valuable in smaller travel trailers or truck campers. The sliding cabinet feature may offer versatile storage options, which may be beneficial in the context of RV living where maximizing storage is often a priority. Additionally, the modular design of the bed assembly may allow for easier installation and customization to fit various RV layouts and sizes, potentially making it adaptable to a wide range of recreational vehicle types and models.

Based upon the foregoing disclosure, it is seen that the present disclosure provides a bed assembly that offers exceptional flexibility in sleeping arrangements. The bed assembly may be easily reconfigured between a spacious king-sized bed and separate twin beds, accommodating varying needs within the same space. The folding capability of the platforms and mattresses, combined with the sliding cabinet, may allow for efficient use of space when the bed is not in use. This versatility may make the bed assembly particularly suitable for environments where space is at a premium, such as small apartments, recreational vehicles, or guest rooms.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A bed assembly, comprising:

a frame having a base and a first rail extending laterally along the base and coupled to the base, the first rail dividing the base into a first base portion and a second base portion;

a pair of platforms arranged to support a pair of mattresses, at least one platform of the pair of platforms being slidably coupled to the first rail and configured to pivot between a sleeping position and a folded position, wherein in the sleeping position, the pair of platforms are disposed horizontally and vertically above the first base portion, and in the folded position, the pair of platforms extends in a vertical direction relative to the base;

a cabinet frame positioned above the base; and a cabinet slidably coupled to the cabinet frame and arranged to move laterally relative to the pair of platforms.

2. The bed assembly of claim 1, wherein the cabinet frame includes a second rail extending laterally, and wherein the cabinet is slidably coupled to the second rail.

3. The bed assembly of claim 2, wherein the cabinet is suspended from the second rail and extends vertically downward from the cabinet frame.

4. The bed assembly of claim 1, wherein each platform of the pair of platforms is pivotally coupled to the first rail at a first end of the platform.

5. The bed assembly of claim 4, wherein the pair of platforms pivot about an axis substantially parallel to the first rail.

6. The bed assembly of claim 1, further comprising a pair of mattresses, each mattress positioned on a respective platform of the pair of platforms.

7. The bed assembly of claim 6, wherein each mattress of the pair of mattresses includes a fold line extending laterally across the mattress, the fold line dividing the mattress into a first mattress portion and a second mattress portion.

* * * * *